US012633868B2

(12) United States Patent      (10) Patent No.:    US 12,633,868 B2

Iisaka      (45) Date of Patent:     May 19, 2026

(54) SOLAR CELL UNIT AND SOLAR CELL UNIT MAINTENANCE SYSTEM

(71) Applicant: TOYOTA JIDOSHA KABUSHIKI KAISHA, Toyota (JP)

(72) Inventor: Hirofumi Iisaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/945,987

(22) Filed: Nov. 13, 2024

(65) Prior Publication Data

US 2025/0202410 A1     Jun. 19, 2025

(30) Foreign Application Priority Data

Dec. 14, 2023    (JP) ................................. 2023-211346

(51) Int. Cl.
| | |
|---|---|
| *H02S 20/30* | (2014.01) |
| *H02S 10/40* | (2014.01) |
| *H02S 50/10* | (2014.01) |

(52) U.S. Cl.
CPC .............. *H02S 20/30* (2014.12); *H02S 10/40* (2014.12); *H02S 50/10* (2014.12)

(58) Field of Classification Search
CPC .......... H02S 20/30; H02S 10/40; H02S 50/10; H02S 30/20; H02S 40/00; H02S 50/15; Y02E 10/50; B65H 18/02; B65H 20/02; B65H 23/188; B65H 23/26; B65H 2701/19
See application file for complete search history.

(56) References Cited

U.S. PATENT DOCUMENTS

| | | | |
|---|---|---|---|
| 2011/0290296 A1* | 12/2011 | Daniel .................... | H10F 77/45 |
| | | | 257/E31.124 |
| 2013/0269768 A1 | 10/2013 | Skorelid et al. | |
| 2024/0339962 A1* | 10/2024 | Yoscovich .............. | H02S 20/30 |

FOREIGN PATENT DOCUMENTS

| | | |
|---|---|---|
| JP | 2010-177497 A | 8/2010 |
| JP | 2013-529395 A | 7/2013 |
| JP | 2014-184833 A | 10/2014 |
| JP | 2019-22251 A | 2/2019 |

* cited by examiner

*Primary Examiner* — Michael Y Sun
(74) *Attorney, Agent, or Firm* — Oliff PLC

(57) ABSTRACT

A solar cell unit capable of easily replacing a film-type solar cell while concurrently using the film-type solar cell and a non-film-type solar cell, and a solar cell unit maintenance system are provided. The solar cell unit includes: a film-type solar cell disposed on a light incident side; a non-film-type solar cell disposed on a side opposite to the light incident side of the film-type solar cell; and a reeling mechanism that reels the film-type solar cell. The film-type solar cell is slidable relative to the non-film-type solar cell by means of the reeling mechanism.

7 Claims, 4 Drawing Sheets

Fig. 4

SOLAR CELL UNIT AND SOLAR CELL UNIT MAINTENANCE SYSTEM

CROSS REFERENCE TO RELATED APPLICATIONS

The present application claims priority from Japanese patent application JP 2023-211346 filed on Dec. 14, 2023, the entire content of which is hereby incorporated by reference into this application.

BACKGROUND

Technical Field

The present disclosure relates to a solar cell unit and a solar cell unit maintenance system.

Background Art

As a solar cell, a crystalline silicon solar cell and a perovskite solar cell have widely been known. The crystalline silicon solar cell is highly efficient in absorbing light energy to convert it into electric energy and has high performance and reliability, and is thus used by being attached to roofs or exterior walls of buildings, as well as being installed on roofs and side surfaces of vehicles as described in JP 2014-184833 A.

SUMMARY

However, since the crystalline silicon solar cell has a drawback in that the light energy absorbing efficiency is reduced in a thinner crystalline silicon solar cell, the thickness needs to be secured for practical use. Further, the crystalline silicon solar cell has a hard glass component and is thus uneasy to be made thinner and softer. For this reason, it is difficult to form the crystalline silicon solar cell as a film-type solar cell. Meanwhile, the perovskite solar cell has a large light energy absorption coefficient and thus can maintain a high conversion efficiency even when it is formed thinner. Further, the perovskite solar cell is lighter, thinner, and softer as compared to the crystalline silicon solar cell and thus can be easily embodied as a flexible film-type solar cell.

In recent years, to enable concurrent use of the film-type solar cell, which is represented by the perovskite solar cell, and a non-film-type solar cell, which is represented by the crystalline silicon solar cell, a tandem structure of these solar cells stacked has been drawing attention. However, the perovskite solar cell is susceptible to light, heat, and moisture, and is thus less durable as compared to the crystalline silicon solar cell. For this reason, the aforementioned tandem structure has a difficulty in replacing the perovskite solar cell at the same timing as the replacement of the crystalline silicon solar cell.

The present disclosure has been made to solve such a technical issue, and provides a solar cell unit capable of easily replacing a film-type solar cell while concurrently using the film-type solar cell and a non-film-type solar cell, and a solar cell unit maintenance system.

A solar cell unit according to the present disclosure includes: a film-type solar cell disposed on a light incident side; a non-film-type solar cell disposed on a side opposite to the light incident side of the film-type solar cell; and a reeling mechanism that reels the film-type solar cell, in which the film-type solar cell is slidable relative to the non-film-type solar cell by means of the reeling mechanism.

Since the solar cell unit according to the present disclosure includes the film-type solar cell disposed on the light incident side and the non-film-type solar cell disposed on the side opposite to the light incident side of the film-type solar cell, the film-type solar cell absorbs light energy with a short wavelength to convert it into electric energy and the non-film-type solar cell absorbs light energy with a long wavelength to convert it into electric energy. In this manner, the film-type solar cell and the non-film-type solar cell can be concurrently used so that the power generation efficiency of the solar cell unit can be improved. Further, since the film-type solar cell is slidable relative to the non-film-type solar cell by means of the reeling mechanism, the film-type solar cell can be easily replaced by being reeled. As a result, the film-type solar cell can be easily replaced at appropriate timing while concurrently using the film-type solar cell and the non-film-type solar cell.

In the solar cell unit according to the present disclosure, the reeling mechanism may include: a first case that houses the film-type solar cell that is unused; a second case disposed at a distance from the first case so as to provide a power generation region between the first case and the second case; and a reeling unit configured to reel out, to the power generation region, the film-type solar cell that is unused and housed in the first case, the reeling unit being configured to cause the second case to house the film-type solar cell reeled out to the power generation region. In this manner, the unused film-type solar cell can be easily reeled out and the used film-type solar cell can be easily housed. Accordingly, the film-type solar cell can be easily replaced.

In the solar cell unit according to the present disclosure, the film-type solar cell may be a perovskite solar cell and the non-film-type solar cell may be a crystalline silicon solar cell. Thus, concurrent use of the film-type solar cell and the non-film-type solar cell can be easily realized while making use of advantages of both the perovskite solar cell and the crystalline silicon solar cell, and the cost of the solar cell unit can be reduced.

Further, a solar cell unit maintenance system according to the present disclosure is a solar cell unit maintenance system that performs maintenance of the aforementioned solar cell unit, and includes: an infrared ray image capturing unit that captures an infrared ray image of a surface of the film-type solar cell present in the power generation region; and a control unit that controls an operation of the reeling mechanism based on the infrared ray image captured by the infrared ray image capturing unit.

In the solar cell unit maintenance system according to the present disclosure, since the control unit controls the operation of the reeling mechanism based on the infrared ray image captured by the infrared ray image capturing unit, it is possible to easily replace the film-type solar cell at appropriate timing when the replacement is determined to be necessary, and thus, the power generation efficiency of the solar cell unit can be maintained.

In the solar cell unit maintenance system according to the present disclosure, the control unit may determine whether an abnormal heat generating area of the film-type solar cell exceeds a preset abnormal heat generating area threshold, based on the infrared ray image captured by the infrared ray image capturing unit, and control the reeling mechanism to replace the film-type solar cell present in the power generation region when it is determined that the abnormal heat generating area exceeds the abnormal heat generating area threshold. In this manner, when it is determined that the abnormal heat generating area has exceeded the abnormal heat generating area threshold, the control unit controls the reeling mechanism to replace the film-type solar cell present in the power generation region, so that the film-type solar cell can be easily replaced at appropriate timing.

The solar cell unit maintenance system according to the present disclosure further includes a sensor to measure a temperature and a humidity inside the first case, and the control unit determines whether the temperature inside the first case exceeds 50° C. and the humidity inside the first case exceeds 50%, based on measurement results from the sensor, and notifies of a state of exceeding when it is determined that the temperature inside the first case exceeds 50° C. and the humidity inside the first case exceeds 50%. In this manner, deterioration of the film-type solar cell due to heat and moisture can be prevented.

According to the present disclosure, a film-type solar cell can be easily replaced while concurrently using the film-type solar cell and a non-film-type solar cell.

BRIEF DESCRIPTION OF THE DRAWINGS

FIG. 4 is a schematic view showing the solar cell unit attached to a vehicle.

DETAILED DESCRIPTION

Hereinafter, with reference to the drawings, an embodiment of a solar cell unit and a solar cell unit maintenance system according to the present disclosure will be described. In the descriptions of the drawings, the same elements are assigned the same reference signs and the overlapping descriptions will be omitted.

Figure 1:
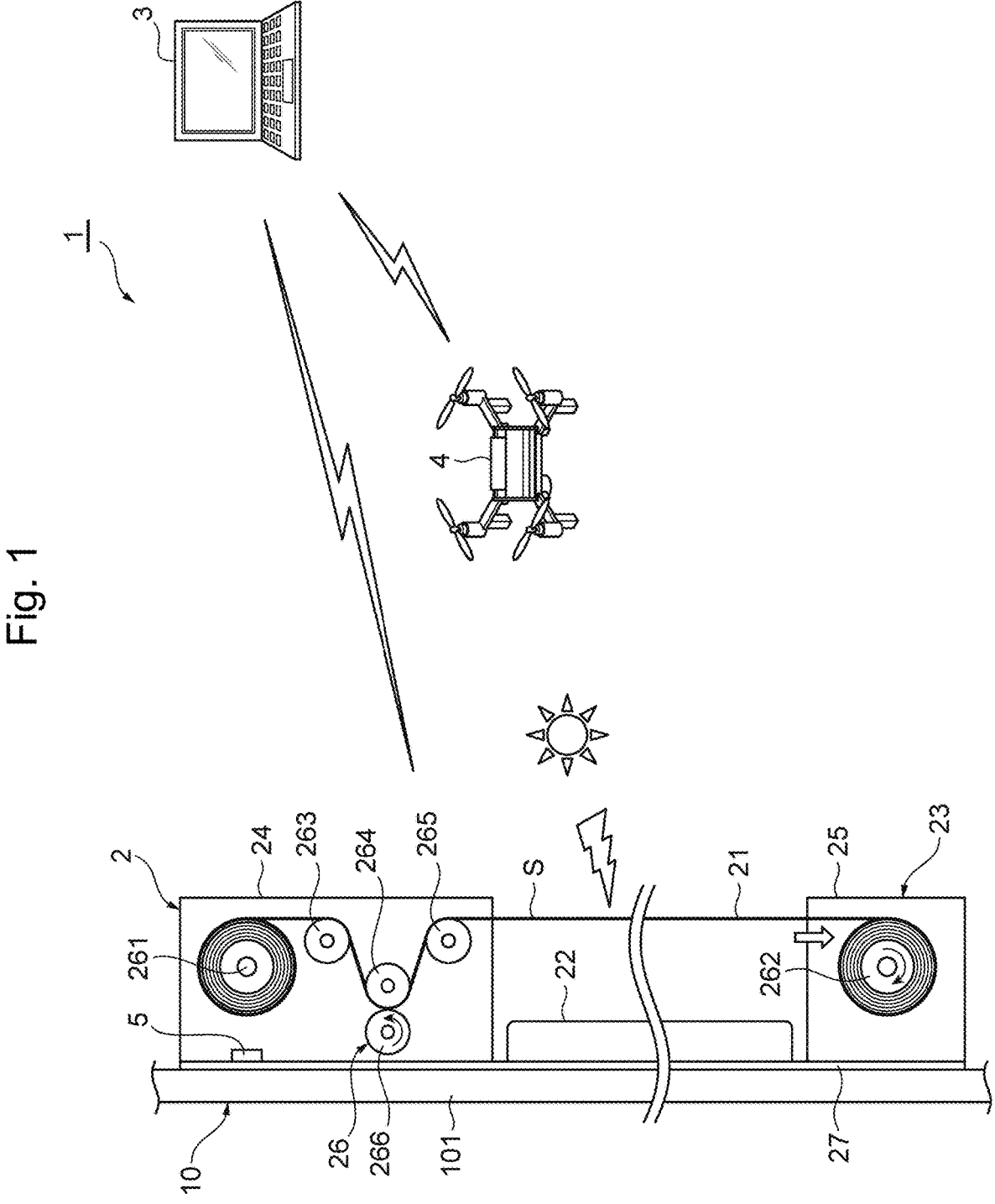
FIG. 1 is a schematic configurational view showing a solar cell unit and a solar cell unit maintenance system.

FIG. 1 is a schematic configurational view showing a solar cell unit and a solar cell unit maintenance system. A solar cell unit maintenance system 1 according to the present embodiment is a system for performing maintenance of a solar cell unit 2 (for example, replacement of the solar cell unit 2, repair of the solar cell unit 2), and includes a drone 4 on which an infrared ray camera is mounted and a control unit 3 that controls the system overall. Hereinafter, the solar cell unit 2 is first described, followed by the description of the solar cell unit maintenance system 1.

[Solar Cell Unit]

As shown in FIG. 1, the solar cell unit 2 is, for example, removably attached to a side surface 101 of a vehicle 10. The solar cell unit 2 includes a film-type solar cell 21 disposed on a light incident side, a non-film-type solar cell 22 disposed on a side opposite to the light incident side of the film-type solar cell 21, and a reeling mechanism 23 that reels the film-type solar cell 21. Note that in the present embodiment, "light incident side" means a side on which the sunlight is made incident.

The film-type solar cell 21 is thin and soft and is a so-called flexible solar cell. Examples of the film-type solar cell 21 include a perovskite solar cell and an amorphous silicon solar cell. The structure of the film-type solar cell 21 will be described below using the perovskite solar cell as an example.

Figure 2:
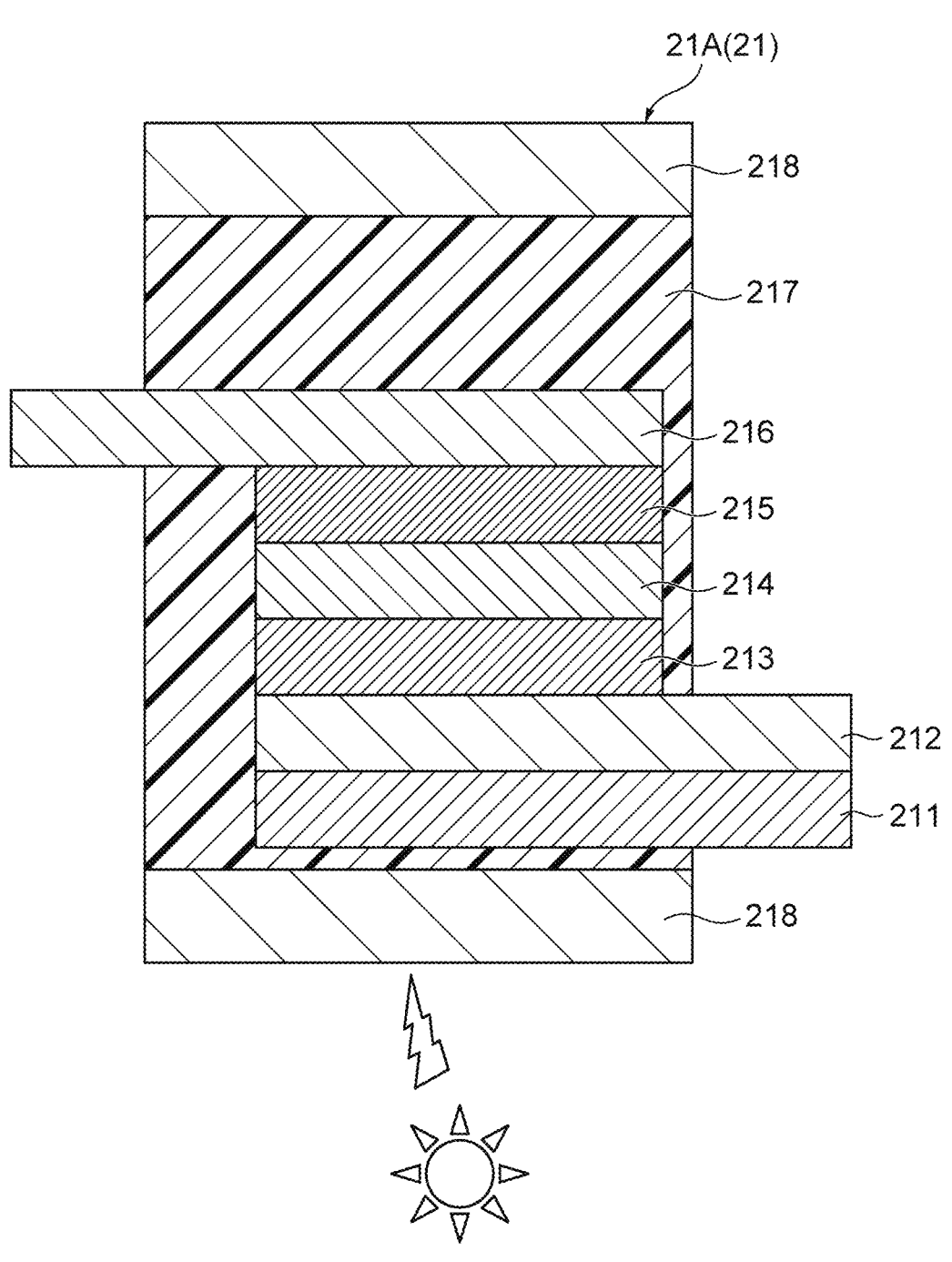
FIG. 2 is a schematic cross-sectional view showing the structure of a film-type solar cell.
Figure 3:
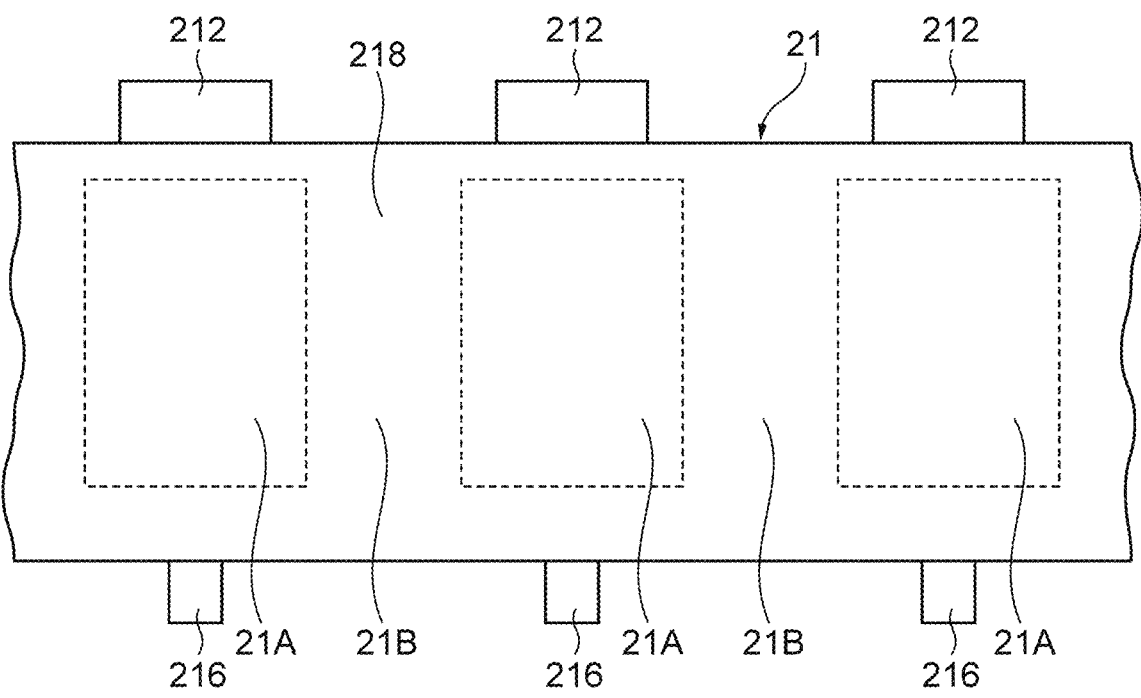
FIG. 3 is a schematic plan view showing the film-type solar cell.

FIG. 2 is a schematic cross-sectional view showing the structure of the film-type solar cell. FIG. 3 is a schematic plan view showing the film-type solar cell. As shown in FIG. 2 and FIG. 3, the film-type solar cell 21 is formed by alternately arranging a plurality of cells 21A and a plurality of insulation sections 21B along a longitudinal direction of the film-type solar cell 21. The cell 21A includes a substrate 211, a transparent electrode 212, a hole transport layer 213, a photoelectric layer 214, an electron transport layer 215, and an electrode 216. Further, the substrate 211, the transparent electrode 212, the hole transport layer 213, the photoelectric layer 214, the electron transport layer 215, and the electrode 216 are sealed by a resin sealing layer 217, but the substrate 211, the transparent electrode 212, and a portion of the electrode 216 are exposed from the resin sealing layer 217. Furthermore, the opposite sides (light incident side and the opposite side) of the resin sealing layer 217 are each provided with a barrier film 218.

Further, the transparent electrode 212 of each cell 21A is electrically connected to a negative terminal (not shown) provided in a reeling drive shaft 262, for example, and the electrode 216 of each cell 21A is electrically connected to a positive terminal (not shown) provided in the reeling drive shaft 262, for example.

The substrate 211, the transparent electrode 212, the hole transport layer 213, the photoelectric layer 214, the electron transport layer 215, and the electrode 216 are respectively formed of, for example, transparent glass or polyethylene terephthalate (PET), an ITO (Indium Tin Oxide) that is a mixture of an indium oxide and a tin oxide, Spiro-OMeTAD, a $CH_3NH_3PbI_3$ perovskite material, a titanium oxide, and Au.

Meanwhile, the insulation section 21B is a portion on which a perovskite material is not coated or printed, and is, for example, formed of only the barrier film 218 and integrally formed with the adjacent cell 21A.

The non-film-type solar cell 22 is, for example, a crystalline silicon solar cell. Since the crystalline silicon solar cell is an already well-known solar cell for use in a solar cell panel, the description on the structure or the like will be omitted.

The reeling mechanism 23 includes a first case 24 that houses the unused film-type solar cell 21, a second case 25 disposed at a distance from the first case 24 so as to provide a power generation region S between the first case 24 and the second case 25, and a reeling unit 26 configured to reel out the unused film-type solar cell 21 housed in the first case 24 to the power generation region S and to cause the second case 25 to house the film-type solar cell 21 reeled out to the power generation region S.

The first case 24 is formed in a box-shape using an aluminum material, for example, and is fixed to one end of an attachment plate 27. The first case 24 houses therein part of components of the reeling unit 26 as well as the unused film-type solar cell 21. Note that the unused film-type solar cell 21 is pivotally supported on a support shaft 261 (described later) inside the first case 24, in a rolled state. Further, on a wall surface, which opposes the second case 25, of peripheral walls of the first case 24, an opening for drawing the housed film-type solar cell 21 out of the first case 24 is disposed.

The second case 25 is formed in a box-shape using an aluminum material, for example, and is fixed to the other end of the attachment plate 27 so as to oppose the first case 24. Further, a space between the first case 24 and the second case 25 forms the aforementioned power generation region S. The second case 25 houses therein the reeling drive shaft 262. Further, on a wall surface, which opposes the first case 24, of the second case 25, an opening corresponding to the opening of the first case 24 and being configured to draw the film-type solar cell 21 into the case is also disposed.

The attachment plate 27 is made of, for example, a metal material such as aluminum and functions to fix the first case 24, the second case 25, and the non-film-type solar cell 22 and also functions as an attachment member in attaching the solar cell unit 2 to the side surface 101 of the vehicle 10.

The reeling unit 26 includes the support shaft 261 disposed inside the first case 24, the reeling drive shaft 262 disposed inside the second case 25, a first free roll 263, a second free roll 264, and a third free roll 265 that are disposed in this order from the support shaft 261 toward the reeling drive shaft 262, and a tension drive shaft 266 adjacent to the second free roll 264.

The support shaft 261 rotatably supports the unused film-type solar cell 21 wound in a roll and is in a cylindrical rod shape, for example, with one end fixed to an inner wall of the first case 24 and the other end as a free end. The unused film-type solar cell 21 is formed in a long shape with a constant width and is wound around a hollow winding core. The unused film-type solar cell 21 wound in such a manner can be housed in the first case 24 by inserting the free end of the support shaft 261 into a hole of the winding core.

The first free roll 263, the second free roll 264, and the third free roll 265 are housed inside the first case 24 and provided so as to form a triangle to adjust the tension of the unused film-type solar cell 21. For example, as shown in FIG. 1, the first free roll 263 and the third free roll 265 are linearly disposed in the up-down direction of the vehicle 10, and the second free roll 264 is disposed closer to the vehicle 10 side relative to the first free roll 263 and the third free roll 265.

The tension drive shaft 266 is disposed at a position adjacent to the second free roll 264 and applies tension to the film-type solar cell 21 so as to reel out the unused film-type solar cell 21 passing the second free roll 264 without sagging. The tension drive shaft 266 is rotationally driven by an electric motor (not shown) in a direction reverse to the direction in which the film-type solar cell 21 is reeled out.

The reeling drive shaft 262 is rotationally driven by an electric motor (not shown) to reel out the unused film-type solar cell 21 housed in the first case 24 to the power generation region S and to reel the film-type solar cell 21 reeled out to the power generation region S.

As shown in FIG. 1, in the power generation region S, the non-film-type solar cell 22 is disposed closer to the vehicle 10 side relative to the film-type solar cell 21. The non-film-type solar cell 22 is fixed to the attachment plate 27.

In the present embodiment, the film-type solar cell 21 and the non-film-type solar cell 22 are not in a structure integrally stacked, but are in a structure independent of each other. Therefore, the film-type solar cell 21 and the non-film-type solar cell 22 may be adjacently disposed or may be disposed at a certain distance from each other.

According to the reeling mechanism 23 of the present embodiment, when the reeling drive shaft 262 is rotationally driven as denoted by an arrow, a winding core fixed to the reeling drive shaft 262 rotates in a direction denoted by the arrow. In this manner, the film-type solar cell 21 present in the power generation region S is pulled toward the second case 25 and is reeled around the winding core fixed to the reeling drive shaft 262. Simultaneously, the unused film-type solar cell 21 housed in the first case 24 is reeled out to the power generation region S.

Note that the film-type solar cell 21 and the non-film-type solar cell 22 may be formed in a two-terminal type in which the solar cells are connected in series or may be formed in a four-terminal type in which electricity is taken out separately from the film-type solar cell 21 and the non-film-type solar cell 22. Further, considering later attachment of the non-film-type solar cell 22, the four-terminal type may be adopted.

In the solar cell unit 2 configured as described above, since the film-type solar cell 21 present in the power generation region S is disposed closer to the light incident side relative to the non-film-type solar cell 22, the film-type solar cell 21 can absorb light energy with a short wavelength to convert it into electric energy and the non-film-type solar cell 22 can absorb light energy with a long wavelength to convert it into electric energy. That is, the film-type solar cell 21 serves as a top cell and the non-film-type solar cell 22 serves as a bottom cell to the sunlight so as to generate power. In this manner, with the concurrent use of the film-type solar cell 21 and the non-film-type solar cell 22, light with a wide variety of wavelengths can be used so that the power generation efficiency of the solar cell unit 2 can be improved.

Further, since the film-type solar cell 21 is slidable relative to the non-film-type solar cell 22 by means of the reeling mechanism 23, the film-type solar cell 21 can be easily replaced by being reeled. Therefore, it is possible to individually replace the film-type solar cell 21 and the non-film-type solar cell 22 that have different durability so that the film-type solar cell 21 can be easily replaced at appropriate timing while concurrently using the film-type solar cell 21 and the non-film-type solar cell 22.

The perovskite solar cell is significantly affected by moisture as well as light and heat. Therefore, when the solar cell unit 2 including the perovskite solar cell is attached to the vehicle 10, arrangement positions of the first case 24 and the second case 25 need to be devised to suppress the effect of the moisture.

Figure 4:
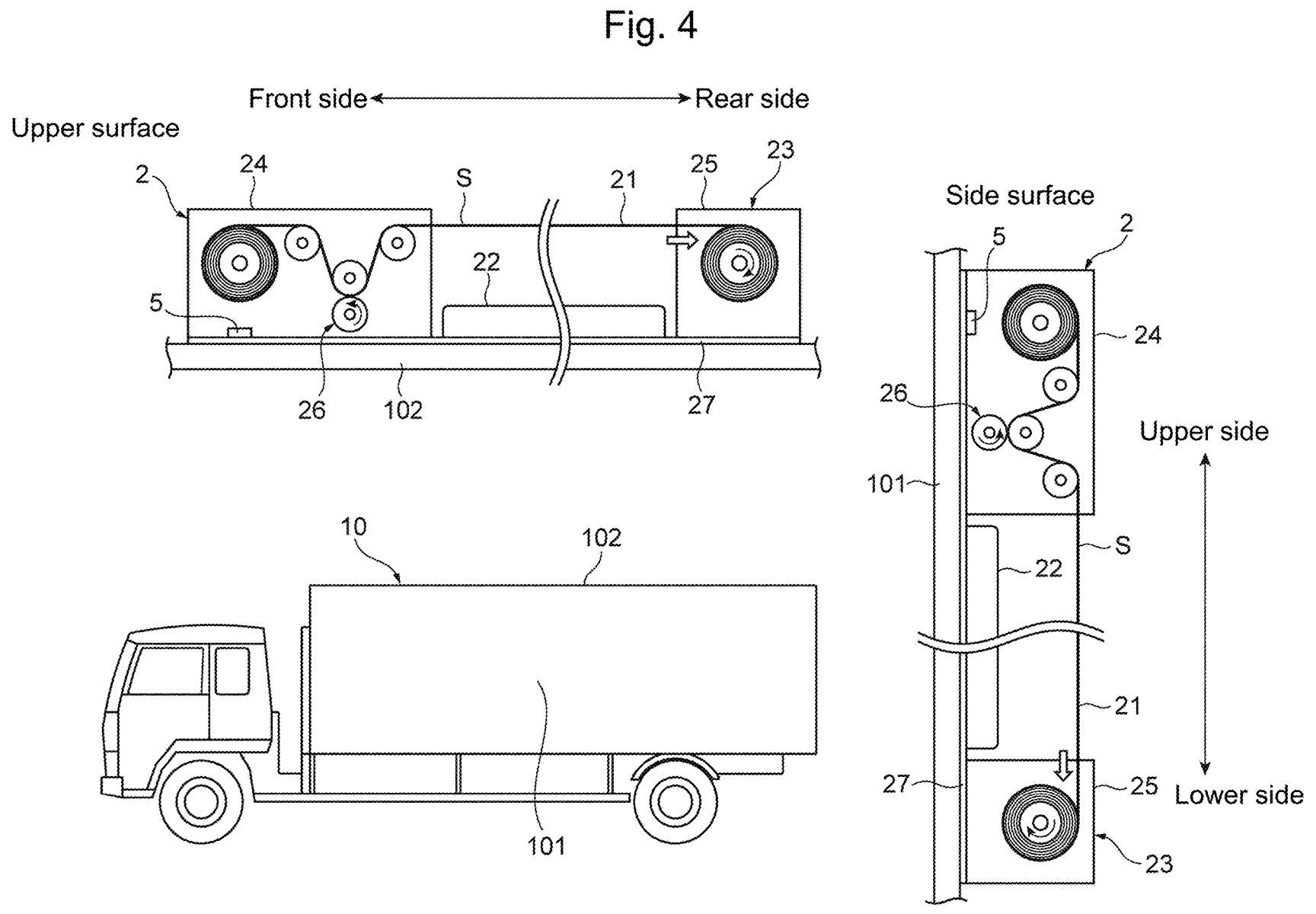

As shown in FIG. 4, for example, in a case where the solar cell unit 2 is attached to an upper surface 102 of the vehicle 10, the first case 24 and the second case 25 may be disposed on a front portion and a rear portion of the vehicle 10, respectively. This is because for example, when water droplets adhere to the upper surface 102 of the vehicle 10, the adhering water droplets move from the front side to the rear side of the vehicle 10 as the vehicle 10 travels. Therefore, by disposing the unused perovskite solar cell on the front side of the vehicle and the used perovskite solar cell on the rear side of the vehicle, deterioration of the unused perovskite solar cell due to moisture is suppressed so that generation of a hot spot (described later) resulted from the deterioration can be prevented.

Meanwhile, in a case where the solar cell unit 2 is attached to the side surface 101 of the vehicle 10, the first case 24 and the second case 25 may be disposed on an upper side of the vehicle 10 and a lower side of the vehicle 10, respectively. This is because for example, when water droplets adhere to the side surface 101 of the vehicle 10, the adhering water droplets move from the upper side to the lower side of the vehicle 10 due to gravity when the vehicle temporarily stops or stops. Therefore, by disposing the unused perovskite solar cell on the upper side of the vehicle and the used perovskite solar cell on the lower side of the vehicle, deterioration of the unused perovskite solar cell due to moisture is suppressed so that generation of a hot spot can be prevented.

[Solar Cell Unit Maintenance System]

As described above, the solar cell unit maintenance system 1 according to the present embodiment includes the drone 4 and the control unit 3. The drone 4 corresponds to an "infrared ray image capturing unit" recited in the claims, and captures an infrared ray image of a surface of the film-type solar cell 21 present in the power generation region S and outputs the image to the control unit 3. The drone 4 is communicatably connected to the control unit 3, and captures the infrared ray image of the surface of the film-type solar cell 21 at the time of power generation and transmits the captured infrared ray image together with the related positional information and the like to the control unit 3.

The control unit 3 is configured with, for example, a microcomputer of a combination of a CPU (Central Processing Unit) that executes calculation, a ROM (Read Only Memory) as a secondary memory device that records programs for calculation, and a RAM (Random Access Memory) as a temporary memory device that saves calculation processes or temporary control variables, and controls the overall solar cell unit maintenance system 1 by executing the stored programs.

For example, the control unit 3 performs control of the reeling mechanism 23, to which the control unit 3 is communicatably connected, such as the operation timing and the operation period of time of the reeling drive shaft 262 and the tension drive shaft 266. Further, the control unit 3 controls the automatic navigation, the capturing timing, the capturing period of time, and the like of the drone 4.

When power is generated using the film-type solar cell 21 such as the perovskite solar cell, a hot spot appears in some cases. The hot spot is a phenomenon in which a portion with a high electric resistance is generated in a portion of the film-type solar cell 21 (for example, part of cells of the perovskite solar cell) to cause abnormal heat generation. The cause of the hot spot generation includes external factors such as adhesion of bird droppings or fallen leaves and internal factors such as defects of solder wiring or cracking of cells due to aged deterioration. Further, when the hot spot is generated, the power generation amount decreases, and therefore, the film-type solar cell 21 needs to be replaced.

To inspect the presence or absence of the hot spot, in the present embodiment, using the drone 4 on which the aforementioned infrared ray camera is mounted, the image of the film-type solar cell 21 present in the power generation region S is captured by aerial shooting from a high position, and the presence or absence of the hot spot is inspected based on a thermal image (infrared ray image) of the film-type solar cell 21. For example, when the vehicle is at a stop, the inspection is conducted using the drone while the solar cell unit 2 is in operation. In that case, since the solar cell units 2 of a plurality of vehicles at a stop can be inspected for a short period of time using one drone, so that the maintenance efficiency can be improved.

In doing so, the control unit 3 determines whether an abnormal heat generating area of the film-type solar cell 21 present in the power generation region S has exceeded a preset abnormal heat generating area threshold, based on the infrared ray image captured by the drone 4. Specifically, the control unit 3 calculates the abnormal heat generating area of the film-type solar cell 21 present in the power generation region S based on the infrared ray image of the film-type solar cell 21 and compares the results of the calculated abnormal heat generating area with the preset abnormal heat generating area threshold, so as to determine whether the abnormal heat generating area has exceeded the abnormal heat generating area threshold.

Further, when it is determined that the abnormal heat generating area has exceeded the abnormal heat generating area threshold, the control unit 3 controls the reeling mechanism 23 to replace the film-type solar cell 21 present in the power generation region S. Specifically, when it is determined that the abnormal heat generating area has exceeded the abnormal heat generating area threshold, the control unit 3 transmits a control command to the reeling drive shaft 262 and the tension drive shaft 266 and rotationally drives each of the reeling drive shaft 262 and the tension drive shaft 266.

When the reeling drive shaft 262 and the tension drive shaft 266 are each rotationally driven, the film-type solar cell 21 (that is, the film-type solar cell 21 having the hot spot) present in the power generation region S slides relative to the non-film-type solar cell 22 and is housed in the second case 25. Simultaneously, the unused film-type solar cell 21 housed in the first case 24 is reeled out to the power generation region S. In this manner, the film-type solar cell 21 present in the power generation region S is replaced.

Note that when it is determined that the abnormal heat generating area has not exceeded the abnormal heat generating area threshold, the control unit 3 does not operate the reeling mechanism. That is, the film-type solar cell 21 present in the power generation region S is not replaced and continuously used for power generation.

Note that the infrared ray image captured by the drone 4 also includes the positional information on the hot spot. The control unit 3 can identify the position of the hot spot based on the positional information on the hot spot. Further, the control unit 3 determines whether to entirely or partially replace the film-type solar cell 21 present in the power generation region S, based on the identified position of the hot spot.

For example, when the hot spot is present over the entire film-type solar cell 21 present in the power generation region S, the control unit 3 determines that the film-type solar cell 21 present in the power generation region S needs to be entirely replaced and transmits a control command to the reeling drive shaft 262 and the tension drive shaft 266 to control the number of rotation and rotating period of time of the reeling drive shaft 262 and the tension drive shaft 266, so that the film-type solar cell 21 present in the power generation region S can be entirely replaced.

Meanwhile, for example, when the hot spot is present not on the entire film-type solar cell 21 present in the power generation region S, but on the second case 25 side, the control unit 3 determines to replace the film-type solar cell 21 only on the second case 25 side where the hot spot is present, instead of the entire film-type solar cell 21 present in the power generation region S. At this time, the control unit 3 controls the number of rotation and rotating period of time of the reeling drive shaft 262 and the tension drive shaft 266, so that the film-type solar cell 21 present in the power generation region S only on the second case 25 side where the hot spot is present can be replaced. By doing so, the usable film-type solar cell 21 is reused so that the cost of the solar cell unit 2 can be reduced.

In the solar cell unit maintenance system according to the present embodiment, the control unit 3 determines whether an abnormal heat generating area of the film-type solar cell 21 has exceeded an abnormal heat generating area threshold, based on the infrared ray image captured by the drone 4, and controls the reeling mechanism 23 to replace the film-type solar cell 21 present in the power generation region S when it is determined that the abnormal heat generating area has exceeded the abnormal heat generating area threshold. In this manner, the presence or absence of the hot spot in the film-type solar cell 21 can be easily identified, and when the hot spot is generated, the replacement of the film-type solar cell 21 can be easily performed at appropriate timing. As a result, reduction in the power generation amount of the solar cell unit 2 due to the hot spot is prevented, so that the power generation efficiency of the solar cell unit 2 can be maintained.

Note that the solar cell unit maintenance system 1 of the present embodiment may further include a sensor 5 that measures the temperature and the humidity inside the first case 24 as shown in FIGS. 1 and 4. The sensor 5 is, for example, fixed to an inner wall of the solar cell unit 2, measures the temperature and the humidity inside the first case 24, and transmits the measured results to the control unit 3.

The control unit 3 determines whether the temperature inside the first case 24 has exceeded a preset temperature threshold and the humidity inside the first case 24 has exceeded a preset humidity threshold, based on the measurement results from the sensor 5. In the present embodiment, based on the results of Example 2 described later, the temperature threshold is set at 50° C. and the humidity threshold is set at 50%. Therefore, the control unit 3 determines whether the temperature inside the first case 24 has exceeded 50° C. and the humidity inside the first case 24 has exceeded 50%.

Further, when it is determined that the temperature inside the first case 24 has exceeded 50° C. and the humidity inside the first case 24 has exceeded 50%, the control unit 3 notifies a driver of the vehicle 10 or/and an operation manager of the solar cell unit maintenance system 1 of such a state of exceeding. As a notifying method, for example, displaying on a display equipped in a driver's cab of the vehicle 10 or a system control room or notifying the driver or the operation manager by means of sound can be conceived.

In this manner, since the driver or the operation manager can recognize that the temperature and the humidity inside the first case 24 have exceeded the respective thresholds, a measure (for example, the driver parks the vehicle 10 under the shade for a while) to lower the temperature and the humidity inside the first case 24 is taken before a given period of time (for example, 15 minutes) elapses from the notification, so that the deterioration of the unused film-type solar cell 21 housed in the first case 24 can be prevented.

If no measure is taken to lower the temperature and the humidity inside the first case 24 and a given period of time (for example, 15 minutes) elapses from the notification, the unused film-type solar cell 21 housed in the first case 24 deteriorates and is thus discarded. In this case, the deteriorated unused film-type solar cell 21 may be replaced with new one.

As described above, the perovskite solar cell is susceptible to heat (temperature) and moisture (humidity) as well as light. For example, $CH_3NH_3PbI_3$, which is a perovskite material, reacts with water to turn into $PbI_2$. With this, a photoelectric layer of the film-type solar cell is decomposed, so that the film-type solar cell deteriorates to change in color (turns yellow). Thus, the present inventors examined the effects of temperature and humidity on the film-type solar cell 21.

Example 1

First, the present inventors prepared a plurality of samples in a plate shape having the structure of the aforementioned film-type solar cell 21 and divided the prepared samples into two groups, for which a high-temperature resistance test (120° C.×360 h) and a low-temperature resistance test (−40° C.×240 h) were respectively conducted. Thereafter, the presence or absence of discoloration of the samples of each group was inspected. As a result, the samples under the high-temperature resistance test changed in color, while the samples under the low-temperature resistance test had almost no change in color. The results have proved that the heat resistance of the perovskite solar cell is relatively low.

Example 2

Further, the present inventors prepared a plurality of samples having the structure of the aforementioned film-type solar cell 21 and inspected the presence or absence of discoloration of the samples due to a change in the humidity under the environment of the temperature at 50° C. More specifically, the samples in a plate shape having the same structure as that of the film-type solar cell 21 were prepared and initial lightness (L), hue (a), and chroma (b) of the prepared samples were measured, and then, the samples were left for 15 minutes under six types of humidity conditions at 50%, 55%, 60%, 65%, 70%, and 85% in the environment of the temperature at 50° C. Thereafter, the lightness (L), hue (a), and chroma (b) of the samples were measured again to obtain the differences (that is, ΔL, Δa, Δb) between the initial lightness, hue, and chroma of the samples and the lightness, hue, and chroma of the samples after being left under the aforementioned conditions, and ΔE was calculated using the following formula (1). Table 1 shows the test conditions and results.

[Formula 1]

$$\Delta E = \sqrt{(\Delta L)^2 + (\Delta a)^2 + (\Delta b)^2} \qquad (1)$$

Note that the lightness (L), hue (a), and chroma (b) of each sample are standards defined by the International Commission on Illumination for expressing colors, and are measured using a device, such as a spectrophotometer and a spectrophotometric colorimeter. The measurement was conducted such that using a spectrophotometer (CM-M6 manufactured by Konica Minolta Japan, Inc.) in accordance with JIS Z 8781, light was irradiated at an angle of 45° relative to the surface of the sample and the reflected light at an angle of 15° relative to the irradiated light was received.

TABLE 1

| Sample | Temperature (° C.) | Humidity (%) | Time (min) | Angle (°) | L | a | b | ΔE |
|---|---|---|---|---|---|---|---|---|
| Initial value | 0 | 0 | 0 | 15 | 53.25 | −5.49 | −18.475 | 0 |
| No. 1 | 50 | 50 | 15 | 15 | 53.83 | −5.88 | −17.78 | 0.99 |
| No. 2 | 50 | 55 | 15 | 15 | 61.48 | −5.23 | −5.05 | 15.75 |
| No. 3 | 50 | 60 | 15 | 15 | 60.19 | −5.39 | −5.76 | 14.49 |

TABLE 1-continued

| Sample | Temperature (° C.) | Humidity (%) | Time (min) | Angle (°) | L | a | b | ΔE |
|---|---|---|---|---|---|---|---|---|
| No. 4 | 50 | 65 | 15 | 15 | 61.2 | −4.96 | −4.71 | 15.90 |
| No. 5 | 50 | 70 | 15 | 15 | 72 | −4.1 | −0.43 | 26.06 |
| No. 6 | 50 | 85 | 15 | 15 | 71.2 | −3.68 | 0.02 | 25.84 |

The results on Table 1 prove that when the temperature is 50° C. or lower and the humidity is 50% or lower, the color difference in the sample is minor and almost no discoloration appears. In other words, by controlling the film-type solar cell 21 under the environment of the temperature at 50° C. or lower and the humidity at 50% or lower, the deterioration of the film-type solar cell 21 due to temperature and moisture can be suppressed.

Further, the results on Table 1 prove that the deterioration of the film-type solar cell 21 can be prevented by taking a measure to lower the temperature and the humidity within 15 minutes from the time when the temperature reaches 50° C. and the humidity exceeds 50%. Note that the time until deterioration can be extended by providing the film-type solar cell 21 with a barrier film or the like.

The embodiment of the present disclosure has been described in detail above, but the present disclosure is not limited to the aforementioned embodiment, and various design changes can be made within the range without departing from the spirit of the present disclosure described in the claims.

For example, in the aforementioned embodiment, the example of the solar cell unit 2 attached to an outer surface of the vehicle 10 has been described, but the solar cell unit 2 may be attached to a train or a building. Further, based on the premise that the power generation of the solar cell unit 2 is not affected, the film-type solar cell 21 may be changed in shape or may be colored so that the film-type solar cell 21 further has advertisement or publicity function.

What is claimed is:

1. A solar cell unit comprising:
a film-type solar cell disposed on a light incident side;
a non-film-type solar cell disposed on a side opposite to the light incident side of the film-type solar cell; and
a reeling mechanism that reels the film-type solar cell, the film-type solar cell being slidable relative to the non-film-type solar cell by way of the reeling mechanism, and the reeling mechanism comprising:
a first case that houses the film-type solar cell that is unused;
a second case disposed at a distance from the first case so as to provide a power generation region between the first case and the second case; and
a reeling unit configured to reel out, to the power generation region, the film-type solar cell that is unused and housed in the first case, the reeling unit being configured to cause the second case to house the film-type solar cell reeled out to the power generation region.

2. The solar cell unit according to claim 1, wherein the film-type solar cell is a perovskite solar cell, and the non-film-type solar cell is a crystalline silicon solar cell.

3. A solar cell unit maintenance system that performs maintenance of the solar cell unit according to claim 1, comprising:

an infrared ray image capturing unit that captures an infrared ray image of a surface of the film-type solar cell present in the power generation region; and
a control unit comprising a processer programmed to control an operation of the reeling mechanism based on the infrared ray image captured by the infrared ray image capturing unit.

4. The solar cell unit maintenance system according to claim 3, wherein
the processor of the control unit is programmed (i) to determine whether an abnormal heat generating area of the film-type solar cell exceeds a preset abnormal heat generating area threshold, based on the infrared ray image captured by the infrared ray image capturing unit, and (ii) to control the reeling mechanism to replace the film-type solar cell present in the power generation region when it is determined that the abnormal heat generating area exceeds the abnormal heat generating area threshold,
the solar cell unit maintenance system further comprises a sensor to measure a temperature and a humidity inside the first case, and
the processor of the control unit is programmed (i) to determine whether the temperature inside the first case exceeds 50° C. and the humidity inside the first case exceeds 50%, based on measurement results from the sensor, and (ii) to notify of a state of exceeding when it is determined that the temperature inside the first case exceeds 50° C. and the humidity inside the first case exceeds 50%.

5. A solar cell unit maintenance system that performs maintenance of a solar cell unit,
the solar cell unit comprising:
a film-type solar cell disposed on a light incident side;
a non-film-type solar cell disposed on a side opposite to the light incident side of the film-type solar cell; and
a reeling mechanism that reels the film-type solar cell, the film-type solar cell being slidable relative to the non-film-type solar cell by way of the reeling mechanism, and
the solar cell unit maintenance system comprising:
an infrared ray image capturing unit that captures an infrared ray image of a surface of the film-type solar cell present in the power generation region; and
a control unit comprising a processor programmed to control an operation of the reeling mechanism based on the infrared ray image captured by the infrared ray image capturing unit.

6. The solar cell unit maintenance system according to claim 5, wherein
the processor of the control unit is programmed (i) to determine whether an abnormal heat generating area of the film-type solar cell exceeds a preset abnormal heat generating area threshold, based on the infrared ray image captured by the infrared ray image capturing unit, and (ii) to control the reeling mechanism to replace the film-type solar cell present in the power generation region when it is determined that the abnormal heat generating area exceeds the abnormal heat generating area threshold, the reeling mechanism comprises a first case that houses the film-type solar cell that is unused, the solar cell unit maintenance system further comprises a sensor to measure a temperature and a humidity inside the first case, and the processor of the control unit is programmed (i) to determine whether the temperature inside the first case exceeds 50° C. and the humidity inside the first case exceeds 50%, based on measurement results from the sensor, and (ii) to notify of a state of exceeding when it is determined that the temperature inside the first case exceeds 50° C. and the humidity inside the first case exceeds 50%.

7. The solar cell unit maintenance system according to claim 5, wherein the film-type solar cell is a perovskite solar cell, and the non-film-type solar cell is a crystalline silicon solar cell.

\* \* \* \* \*